US 11,764,942 B2

(12) United States Patent
Liao et al.

(10) Patent No.: US 11,764,942 B2
(45) Date of Patent: Sep. 19, 2023

(54) HARDWARE ARCHITECTURE FOR MEMORY ORGANIZATION FOR FULLY HOMOMORPHIC ENCRYPTION

(71) Applicants: Haohao Liao, Waterloo (CA); Zhiwei Shang, Waterloo (CA); Yin Tan, Waterloo (CA)

(72) Inventors: Haohao Liao, Waterloo (CA); Zhiwei Shang, Waterloo (CA); Yin Tan, Waterloo (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 17/335,927

(22) Filed: Jun. 1, 2021

(65) Prior Publication Data

US 2022/0385447 A1   Dec. 1, 2022

(51) Int. Cl.
*H04L 9/00* (2022.01)

(52) U.S. Cl.
CPC ..................... *H04L 9/008* (2013.01)

(58) Field of Classification Search
CPC ....................................................... H04L 9/008
See application file for complete search history.

(56) References Cited

U.S. PATENT DOCUMENTS

| | | | |
|---|---|---|---|
| 10,298,385 B2 | 5/2019 | Khedr et al. | |
| 10,644,877 B2 | 5/2020 | Khedr et al. | |
| 2006/0248135 A1 | 11/2006 | Cousineau et al. | |
| 2007/0266070 A1 | 11/2007 | Sung et al. | |
| 2018/0294950 A1* | 10/2018 | Khedr | G09C 1/00 |
| 2019/0268135 A1 | 8/2019 | Khedr et al. | |
| 2021/0218563 A1* | 7/2021 | Liu | H04L 9/0838 |
| 2022/0255721 A1* | 8/2022 | Ren | G06F 9/5027 |

FOREIGN PATENT DOCUMENTS

CN            103970718 A       8/2014

OTHER PUBLICATIONS

Roy et al., FPGA-based High-Performance Parallel Architecture for Homomorphic Computing on Encrypted Data Feb. 2019.
Riazi et al., HEAX: An Architecture for Computing on Encrypted Data Mar. 9, 2020.
Cousins, Rohloff; and Sumorok, Designing an FPGA-Accelerated Homomorphic Encryption Co-Processor Oct. 20, 2016.

* cited by examiner

*Primary Examiner* — Meng Li

(57) ABSTRACT

Systems and memory devices are disclosed for fully homomorphic encryption (FHE). The system may include a processing unit including: a data memory for storing coefficients for a polynomial; a twiddle factor (TF) memory for storing TF values associated with the polynomial; a TF register connected to the TF memory; a plurality of first registers connected to the data memory; a plurality of first MUXs connected to the first registers; a plurality of second registers connected to the plurality of first MUXs; a plurality of Butterfly (BF) cores connected to the plurality of the second registers and the TF register; wherein each of the plurality of BF cores is configured to, responsive to a control signal, perform a Butterfly Transform (BFT) operation based on two coefficients from the data memory and a TF value from the TF memory.

5 Claims, 8 Drawing Sheets

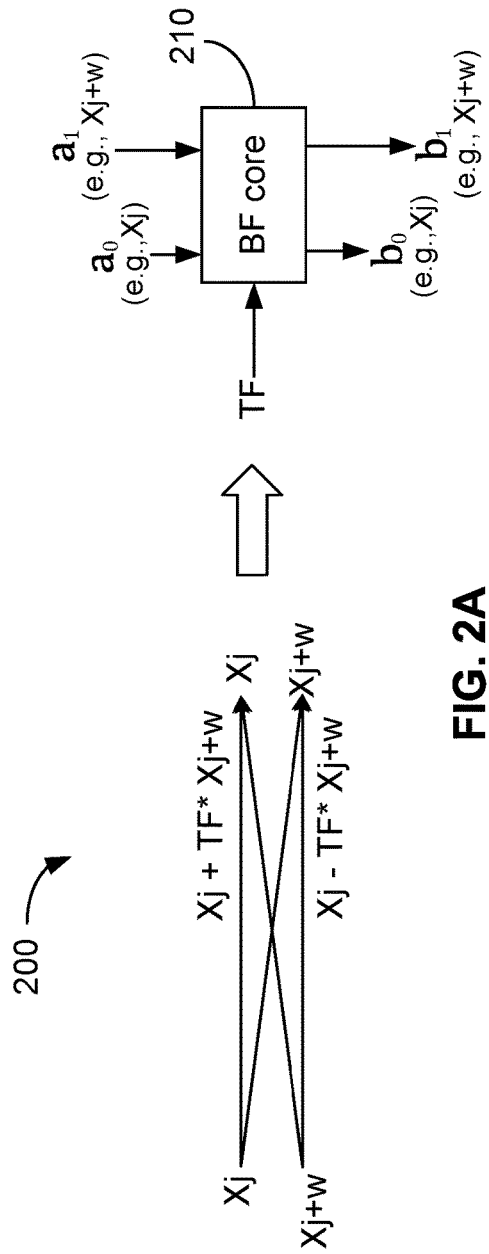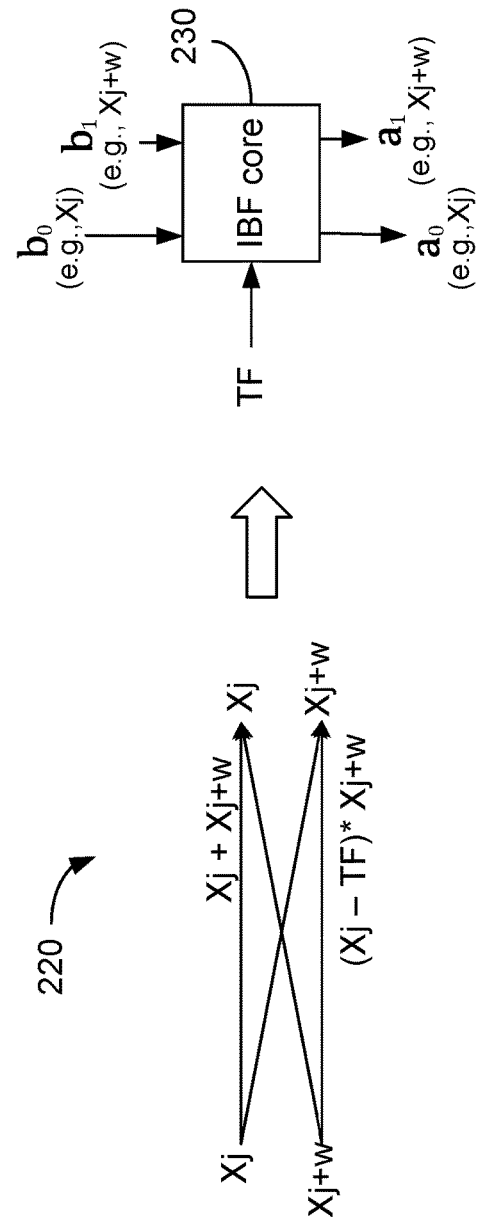
FIG. 2A
FIG. 2B

HARDWARE ARCHITECTURE FOR MEMORY ORGANIZATION FOR FULLY HOMOMORPHIC ENCRYPTION

RELATED APPLICATIONS

This is the first patent application for the present disclosure.

TECHNICAL FIELD

The present application relates to hardware architecture for post-quantum cryptography, and in particular to systems and methods for lattice-based cryptography.

BACKGROUND

Lattice-based cryptography has been used for both post-quantum cryptography and fully homomorphic encryption (FHE). FHE enables encrypted computing and protects data in use. More specifically, efficient FHE systems can perform computation on ciphertexts (i.e., encrypted data), and generates an encrypted result that can be decrypted to obtain a final data that would have been produced had the computation been performed on the unencrypted data, without compromising the security of a single bit of data.

Therefore, with FHE, it is possible to analyze or manipulate encrypted data without exposing the original data. Analytical functions can be run directly on encrypted data while yielding the same encrypted results as if the functions were run on plaintext. More generally speaking, lattice-based cryptography and FHE has great potential and applicability in areas with sensitive personal data such as in financial services or healthcare, where privacy concern is paramount.

A problem of FHE systems is the great amount of computation overhead that occurs with large scale computation on encrypted data. Within FHE systems, the operation of polynomial multiplication is one of the most computation intensive tasks. In order to achieve desired security level and multiplicative depth, the polynomial can be huge in terms of both degree and coefficient size. For example, the polynomial degree can be greater than $2^{12}$, while the length of the coefficient can be several hundred bits. Typically, polynomial multiplication has a complexity of $O(n^2)$ where n is the degree of the polynomial, which can cause the FHE processing to be extremely slow with a very high computation overhead.

An example hardware architecture developed to implement lattice-based cryptography systems is the HEAX, as described in Riazi, M. Sadegh, et al., "*HEAX: An Architecture for Computing on Encrypted Data.*" ASPLOS '20, Association for Computing Machinery, New York, N.Y., USA, 1295-1309, the entire content of which is herein incorporated by reference. However, the design of the HEAX architecture still has the drawback that with larger parallel computing, the consumption of combinational logic resource is significantly increased.

SUMMARY

The present disclosure describes systems and memory devices for fully homomorphic encryption (FHE). In accordance with some aspects, a FHE system may include a FHE processing unit, which may be used to deal with the large polynomial multiplication, which may include: a data memory for storing coefficients for a polynomial; a twiddle factor (TF) memory for storing TF values associated with the polynomial; a TF register connected to the TF memory; a plurality of first registers connected to the data memory; a plurality of first multiplexors (MUXs) connected to the first registers; a plurality of second registers connected to the plurality of first MUXs; a plurality of Butterfly (BF) cores connected to the plurality of the second registers and the TF register; wherein each of the plurality of BF cores is configured to, responsive to a control signal, perform a Butterfly Transform (BFT) operation based on two coefficients from the data memory and a TF value from the TF memory.

The disclosed embodiments are configured to utilize the BF (or Inverse Butterfly (IBF)) cores in an efficient manner, where each BF (or IBF) core is performing a BFT (or Inverse Butterfly Transform (IBF)) operation in each of a plurality of consecutive clock cycles, immediately subsequent to an initial clock cycle where the first two coefficients are read from the (dual-port) data memory. In addition, there is no conflict between a memory read operation and a memory write operation of the data memory. As the degree of the polynomial n reaches a rather large number (e.g., n>4096), and the requirement of the throughput is high, which requires the use of a large number of BF cores (e.g., NC>32), the disclosed embodiments are configured to facilitate a high throughput without sacrificing the efficiency of the BF or IBF operation performance by the FHE processing unit.

In some example embodiments, the processing unit may further include: a plurality of second MUXs connected to the plurality of BF cores; and a plurality of third registers connected to the plurality of second MUXs and to the data memory; where at least one of the plurality of second MUXs is configured to, responsive to a control signal, select one of two transformed coefficients from the plurality of BF cores; and at least one of the plurality of third registers is configured to retrieve the selected transformed coefficient from the at least one of the plurality of second MUXs for writing to the data memory.

In some example embodiments, the data memory may include a dual-port random access memory (DPRAM) having: a first port ("Port A") and a second port ("Port B").

In some example embodiments, the plurality of first registers may include: a Port A first register connected to the Port A of the data memory; and a Port B first register connected to the Port B of the data memory.

In some example embodiments, the Port A first register and Port B first register are configured to read the two coefficients from the data memory in a first clock cycle.

In some example embodiments, the Port A first register and Port B first register are configured to write the two coefficients to the plurality of first MUXs in the first clock cycle.

In some example embodiments, the plurality of third registers may include: a Port A third register connected to the Port A of the data memory; and a Port B third register connected to the Port B of the data memory, wherein the Port A third register and Port B third register are configured to write the two transformed coefficients to the data memory in a subsequent clock cycle after the first clock cycle.

In some example embodiments, each of the plurality of BF cores is configured to, responsive to a control signal, perform the BFT operation in each of a plurality of clock cycles immediately subsequent to the first clock cycle.

In some example embodiments, the TF memory is configured to store a plurality of TF values required to perform a plurality of BFT operations by the plurality of BF cores.

In some example embodiments, some of the TF values are stored multiple times on the TF memory.

In accordance with another aspect, a memory device for fully homomorphic encryption (FHE) is disclosed. The memory device may have a memory organization layout configured for storing a plurality of twiddle factor (TF) values used in one or more Butterfly Transform (BFT) operations for a polynomial, where each TF value of the plurality of TF values is stored on the memory device based on a respective index value of the respective TF value.

In some example embodiments, when the respective index value of the TF value is between 1 to N/NC−1, the TF value is stored in the memory device a total of NC times, where N represents a total number of coefficients of the polynomial for which the TF values are stored; and NC represents a total number of Butterfly (BF) cores used to perform the one or more BFT operations.

In some example embodiments, when the respective index value of the TF value is between N/NC to 2*N/NC−1, the TF value is stored in the memory device a total of NC/2 times.

In some example embodiments, when the respective index value of the TF value is between 2*N/NC to 4*N/NC−1, the TF value is stored in the memory device a total of NC/4 times.

In some example embodiments, when the respective index value of the TF value is between $2^i$*N/NC to $2^{i+1}$*N/NC−1, the TF value is stored in the memory device a total of NC/$2^{i+1}$ times.

In accordance with yet another aspect, a memory device for fully homomorphic encryption (FHE) is disclosed. The memory device may have a memory organization layout configured for storing a plurality of twiddle factor (TF) values used in one or more Inverse Butterfly Transform (IBFT) operations for a polynomial, where each TF value of the plurality of TF values is stored on the memory device based on a respective index value of the respective TF value.

In some example embodiments, when the respective index value of the TF value is between N/2 to N−1, the TF value is stored in the memory device once; and N represents a total number of coefficients of the polynomial for which the TF values are stored.

In some example embodiments, when the respective index value of the TF value is between N/4 to N/2−1, the TF value is stored in the memory device twice.

In some example embodiments, when the respective index value of the TF value is between N/8 to N/4−1, the TF value is stored in the memory device 4 times.

In some example embodiments, when the respective index value of the TF value is between N/$2^i$ to N/$2^{i-1}$), the TF value is stored in the memory device a total of $2^{(i-1)}$ times when $2^{(i-1)}$<NC; and NC represents a total number of Inverse Butterfly (IBF) cores used to perform the one or more IBFT operations.

BRIEF DESCRIPTION OF THE DRAWINGS

Reference will now be made, by way of example, to the accompanying figures which show example embodiments of the present application, and in which:

FIG. 2A illustrates a schematic diagram for an example Butterfly Transform (BFT) operation used in FHE systems.

FIG. 2B illustrates a schematic diagram for an example inverse Butterfly Transform (IBFT) operation used in FHE systems.

Like reference numerals are used throughout the figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Figure 1A:
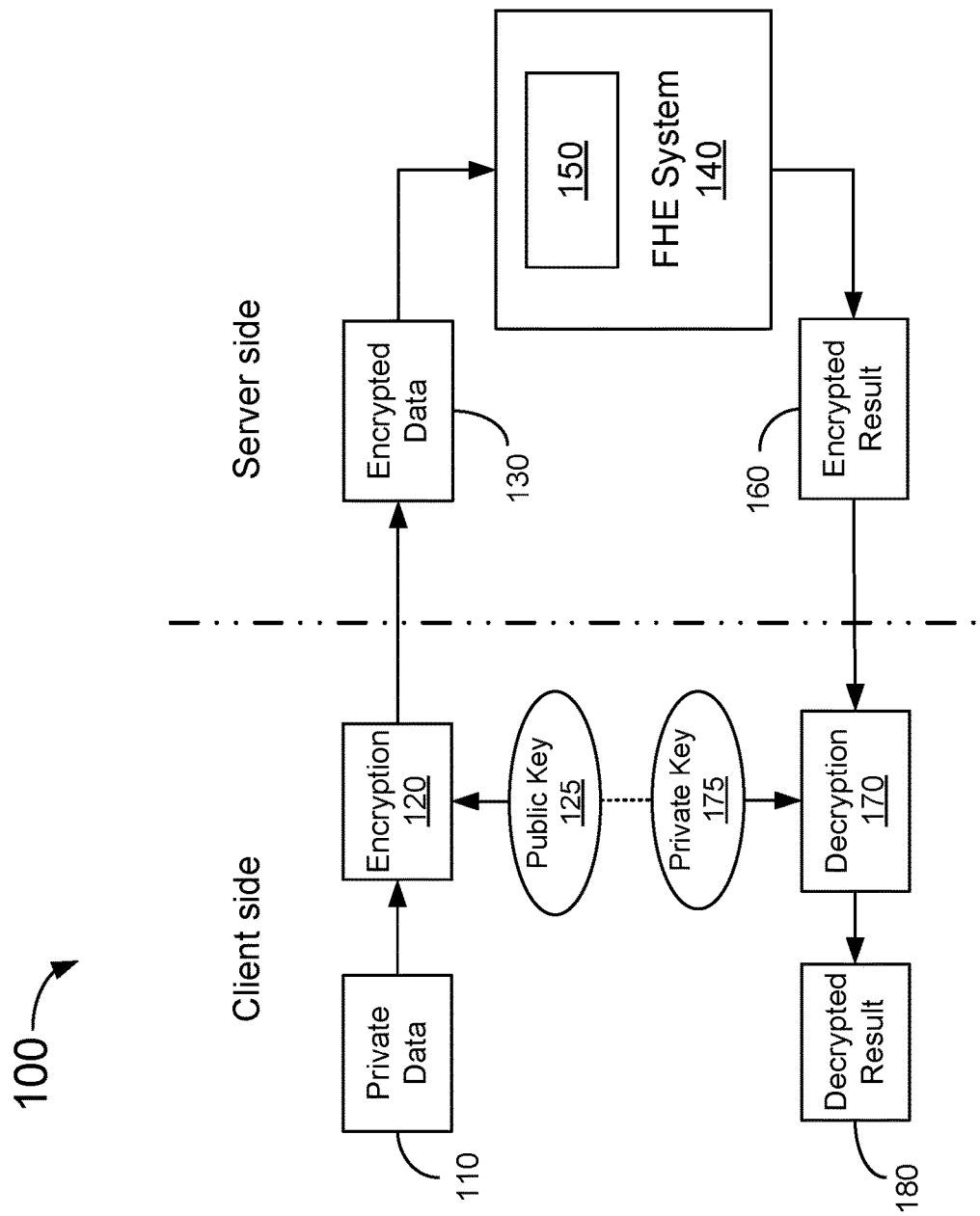
FIG. 1A illustrates an example system for FHE encryption.

FIG. 1A illustrates an example system 100 for FHE encryption. As mentioned, efficient FHE systems can perform computation on ciphertexts (i.e., encrypted data), and generates an encrypted result that can be decrypted to obtain a final data that would have been produced had the computation been performed on the unencrypted data, without compromising the security of a single bit of data.

In FIG. 1A, system 100 includes a client side and a server side. The client side may generate private data 110, which is then encrypted by an encryption process 120. For example, the client server may use a public key 125 to encrypt the data 110, and send the encrypted data 130 to the server side. On the server side, a FHE system 140, which may be on a server, can perform FHE computations on the encrypted data 130 using a FHE processing unit 150, and sends the encrypted result 160 to the client side. The client server can perform decryption process 170 on the encrypted result 160 using a private key 175 corresponding to the public key 125 used in encryption process 120, then access the decrypted result 180.

Figure 1B:
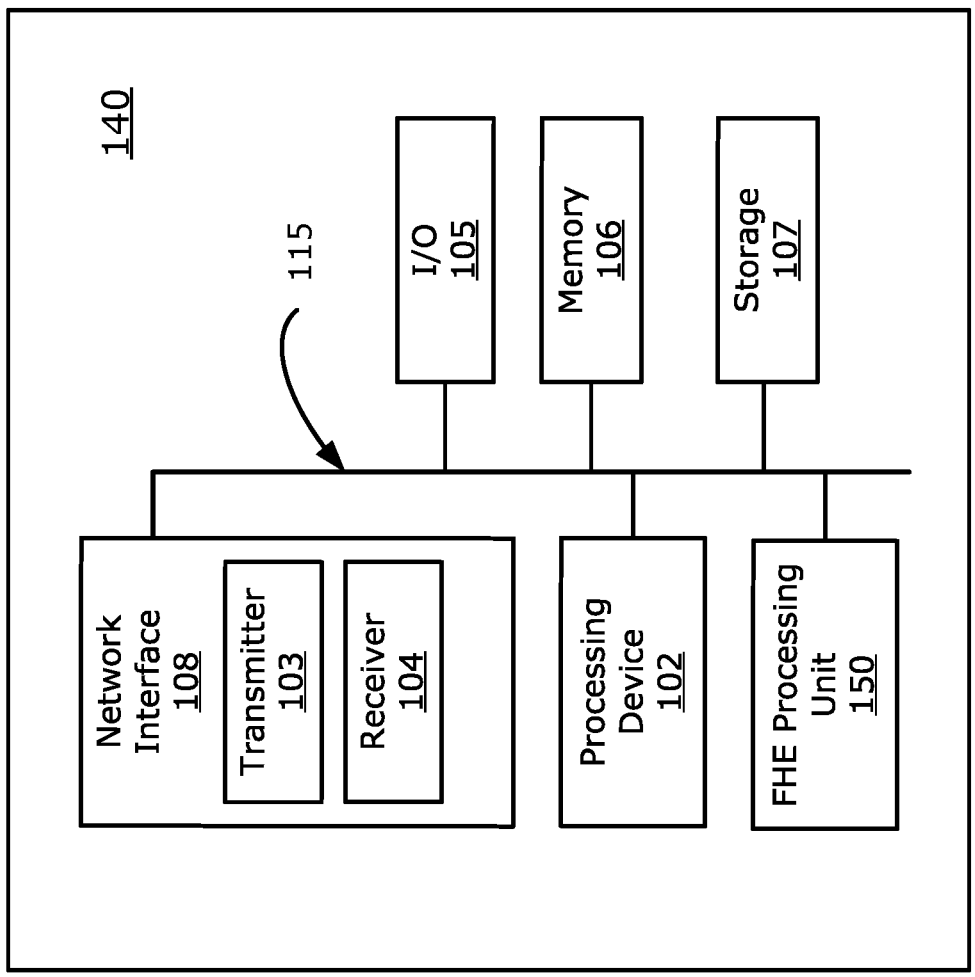
FIG. 1B illustrates an example system which may be used to implement a FHE system including a FHE processing unit.

FIG. 1B illustrates an example FHE system 140 which may be used to implement a FHE system including a FHE processing unit 150 described herein. Other processing systems suitable for implementing the methods and systems described in the present disclosure may be used, which may include components different from those discussed below. Although FIG. 1B shows a single instance of each component, there may be multiple instances of each component in the FHE system 140.

The FHE system 140 may include one or more processing devices 102, such as a processor, a microprocessor, an application-specific integrated circuit (ASIC), a field-programmable gate array (FPGA), a dedicated logic circuitry, or combinations thereof. The FHE system 140 may further include a dedicated FHE processing unit 150, which may be a processor, a microprocessor, an application-specific integrated circuit (ASIC), a field-programmable gate array (FPGA), a dedicated logic circuitry, or combinations thereof.

The FHE system 140 may also include one or more input/output (I/O) interfaces 105, which may enable interfacing with one or more appropriate input devices and/or output devices (not shown). One or more of the input devices and/or output devices may be included as a component of the FHE system 140 or may be external to the FHE system 140. The FHE system 140 may include one or more network interfaces 108 for wired or wireless communication with a network. In some example embodiments, network interfaces 108 include one or more wireless interfaces such as transmitters 103 and receivers 104 that enable communications in a network. The network interface(s) 108 may include interfaces for wired links (e.g., Ethernet cable) and/or wireless links (e.g., one or more radio frequency links) for intra-network and/or inter-network communications.

The FHE system 140 may include one or more memories 106, which may include a volatile or non-volatile memory (e.g., a flash memory, a random access memory (RAM), and/or a read-only memory (ROM)). The non-transitory memory(ies) 106 may store instructions for execution by the processing device(s) 102 or the FHE processing unit 150, such as to carry out the present disclosure. The memory(ies) 106 may include other software instructions, such as for implementing an operating system and other applications/functions. In some examples, one or more data sets and/or module(s) may be provided by an external memory (e.g., an external drive in wired or wireless communication with the FHE system 140) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The FHE system 140 may also include one or more storage units 107, which may include a mass storage unit such as a solid state drive, a hard disk drive, a magnetic disk drive and/or an optical disk drive.

There may be a bus 115 providing communication among components of the FHE system 140, including the processing device(s) 102, the FHE processing unit 150, I/O interface(s) 105, network interface(s) 108, memory(ies) 106, and storage unit(s) 107. The bus 115 may be any suitable bus architecture including, for example, a data path bus, a control data path bus, a memory bus, a peripheral bus or a video bus.

Referring back to the FHE processing unit 150, which carries out the FHE computation on encrypted data 130. A fundamental operation in FHE computations is the multiplication of two polynomials of large degrees. The Number Theoretic Transform (NTT) is a special version of the Fast Fourier Transform (FFT) that is used to efficiently perform a polynomial multiplication, which has a reduced complexity of $O(N \log (N))$.

A key structure of the NTT is the Butterfly Transform (BFT) operation. The core operation of the BFT is shown in FIG. 2A, which illustrates a schematic diagram for an example Butterfly Transform (BFT) operation 200 used in FHE systems. The NTT is a special version of the Discrete Fourier Transform (DFT), in which the coefficient ring is taken to be a finite field (or ring) containing the right roots of unity. NTT, which is also sometimes known as the BFT, as well as the inverse operation INTT (also known as the IBFT), can be implemented for a range of application, including digital signal processing and fast multiplications of large integers. NTT and INTT for faster lattice-based cryptography have been discussed at length in Patrick Longa and Michael Naehrig, *Speeding up the number theoretic transform for faster ideal lattice-based cryptography*, In International Conference on Cryp-tology and Network Security, pages 124-139, Springer, 2016, the entire content of which is herein incorporated by reference.

A Butterfly (BF) core 210 is a modular core that performs a specific arithmetic operation (i.e., the BFT operation) within the FHE processing unit 150. The BF core 210 takes two input polynomial coefficients $a_0$ (e.g., Xj) and $a_1$ (e.g., Xj+w), and one twiddle factor (TF), and then outputs two transformed coefficients $b_0$ (e.g., Xj) and $b_1$ (e.g., Xj+w). A twiddle factor is any of the trigonometric constant coefficients used in the FFT algorithm, and can be stored in a local memory. In the examples illustrated in FIGS. 2A and 2B, Xj and Xj+w represent two different coefficients, where j and j+w each refers to a respective index.

In some embodiments, a twiddle factor is precomputed before starting the BFT/IBFT. For BFT, a twiddle factor can be generated by using a base value phi, which satisfies $phi^N = -1 \pmod{p}$, where p is the modulus of the coefficient. For example, the twiddle factor value of index j is calculated as $phi^{x[j]} \pmod{p}$, where x is a list which stores the power from 0 to N-1 in bit-reverse order. For IBFT, $phi^{-1}$ is used as the base, which satisfies $phi^{-1} * phi = 1 \pmod{p}$.

Throughout the disclosure, "NC" represents the number of Butterfly (BF) cores in a given hardware architecture, the symbol "*" indicates the mathematical operation of multiplication, and "N" indicates the degree of polynomial.

A BF core 210 performs a forward transform on the polynomial inputs $a_0$ and $a_1$, and the result are two polynomial outputs $b_0$ and $b_1$. Multiple BF cores 210 can be used to transform multiple coefficients at the same clock cycle, thereby improving the throughput of the BFT 500.

Generally speaking, a polynomial P(x) of degree n is a function represented by: $P(x) = a_n x^n + a_{n-1} x^{n-1} + a_{n-2} x^{n-2} \ldots + a_1 x + a_0$, the numbers $a_j$, j=0 . . . n are coefficients. As a very simple example, a polynomial of degree $2^x - 1$ requires x stages to finish the BFT/IBFT operation. In each stage, N coefficients are transformed. Each BF core 210 (or IBF core 230) can process 2 coefficients for each clock cycle. Hence, with multiple BF cores 210 (e.g., a total number of NC cores), 2*NC coefficients can be transformed within each clock cycle. The total number of clock cycles required to finish one stage is N/(2*NC). Therefore, when the total number of BF cores 210 (or IBF cores 230) increases, the total number of clock cycles required to finish one stage decreases.

FIG. 2B illustrates a schematic diagram for an example inverse Butterfly Transform (IBFT) operation 220 used in FHE systems. The IBF core 230 performs an IBFT operation 220 which is a reverse operation of the BF transform. The IBF core 230 performs a backward transform on two polynomial inputs $b_0$ and $b_1$, and the result may be the two transformed polynomial outputs $a_0$ and $a_1$, as a reverse operation to the forward transform performed by the BF core 210.

In some embodiments, the output of an IBF core 230 may not be equal to the input of the BF core 210. For example, assuming BFT ( ) is a function representing the Butterfly Transform operation 200, and IBFT ( ) is a function representing the inverse Butterfly Transform operation 220, then b0, b1=BFT (a0, a1), but in some cases, a0, a1≠IBFT (b0, b1). The IBF core 230 is associated with the IBFT, after the transformation has been finished, where the output polynomial from the IBFT are the same as the input polynomial of the BFT transform. For example, polynomial A=BFT (polynomial B) and polynomial B=IBFT (polynomial A).

Figure 3:
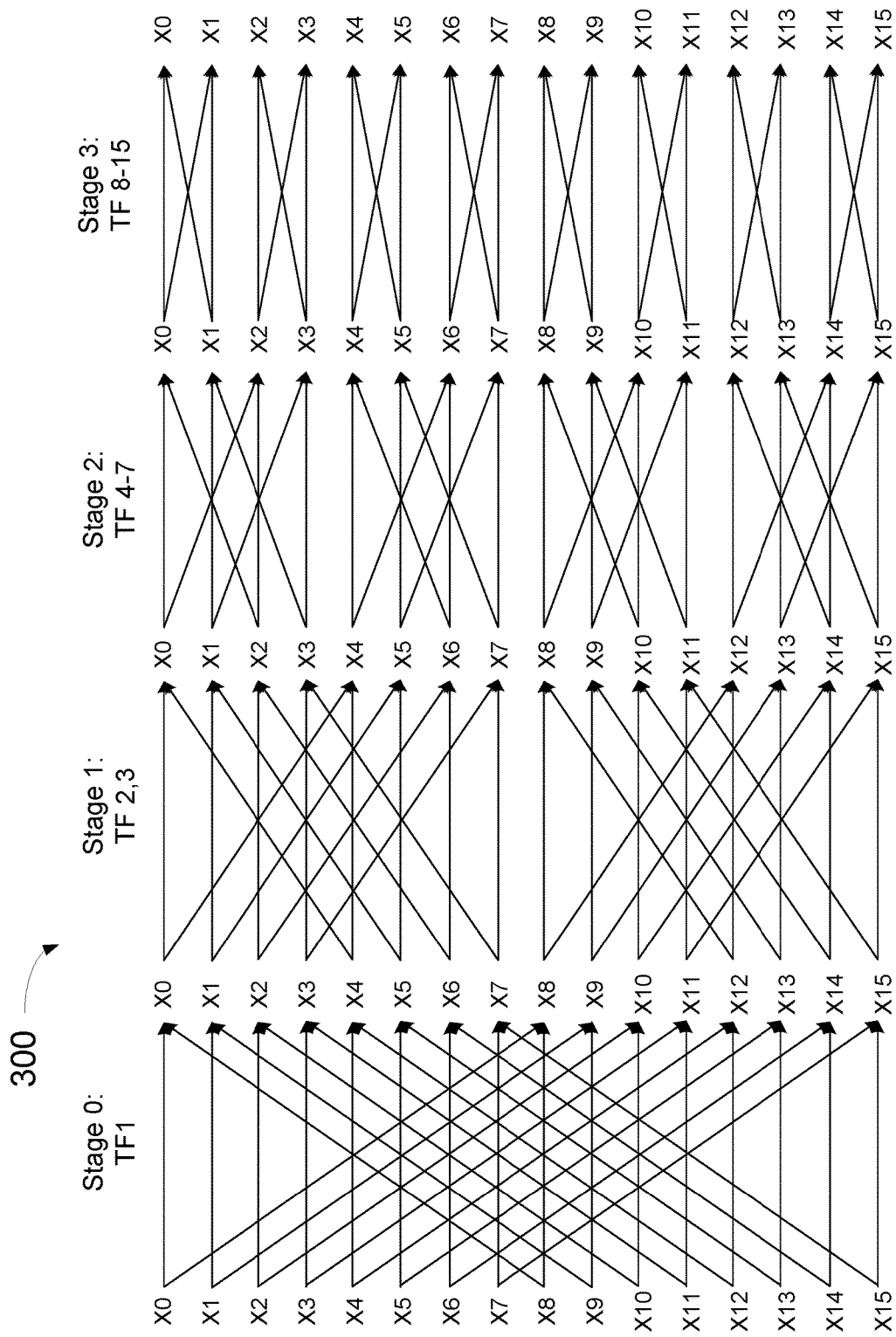
FIG. 3 illustrates a schematic diagram for a BFT operation with 16 coefficients.

FIG. 3 illustrates a schematic diagram 300 for a BFT operation with 16 (i.e., $2^4$) coefficients. There are 4 stages, i.e., stages 0 to 3, required to complete the forward transform. As can be seen, one twiddle factor is required at stage 0, two twiddle factors are required at stage 2, four twiddle factors are required at stage 3, and eight twiddle factors are required at stage 4. In general, for a BFT which transforms $2^n$ coefficients, n stages are needed to complete the forward transform, and at the $i^{th}$ stage, the transform takes $2^i$ twiddle factors, where i=0, 1, 2 . . . (n−1).

Figure 4:
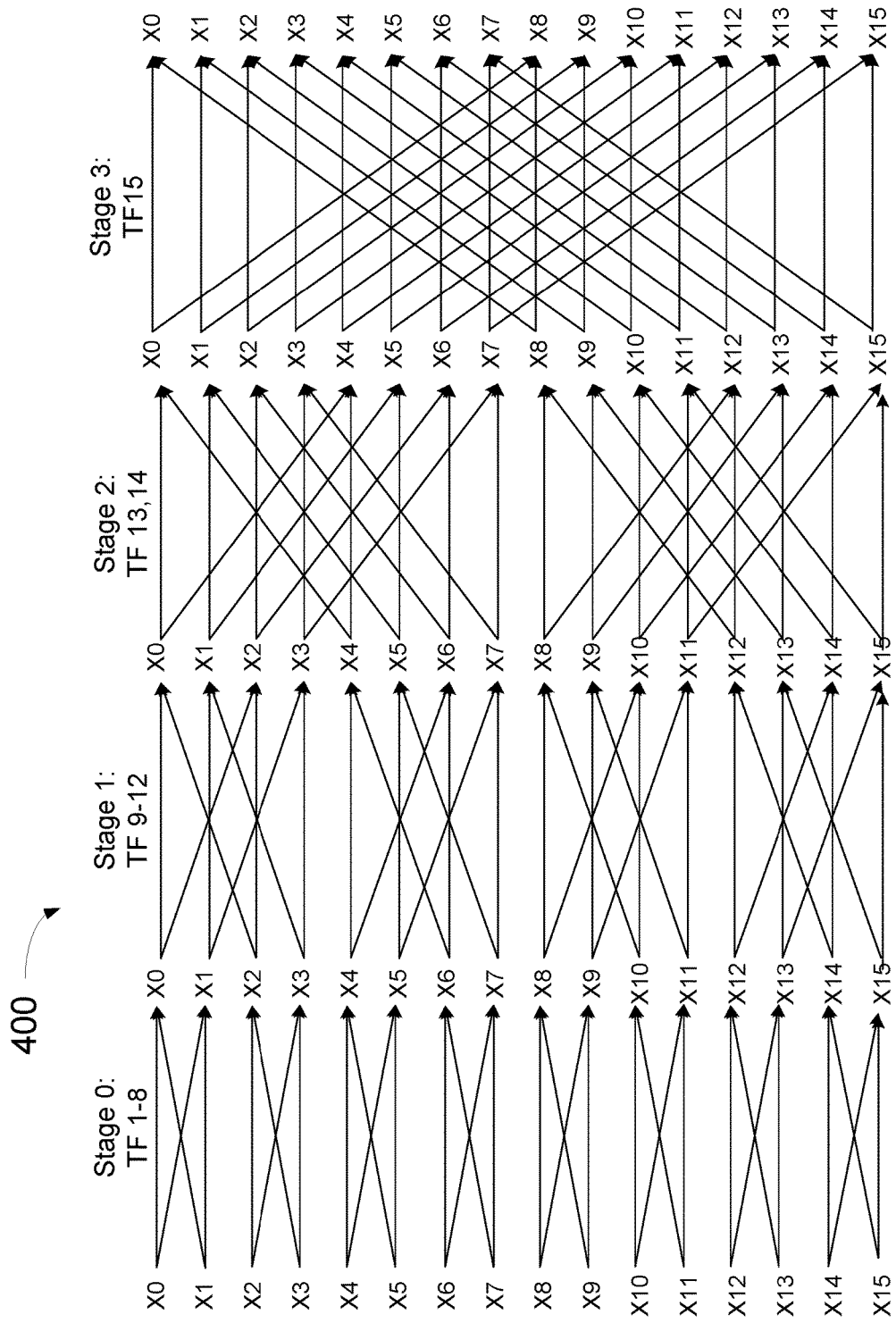
FIG. 4 illustrates a schematic diagram for an IBFT operation with 16 coefficients.

FIG. 4 illustrates a schematic diagram 400 for an IBFT operation with 16 (i.e., $2^4$) coefficients. There are 4 stages, i.e., stages 0 to 3, required to complete the backward transform. In general, for an IBFT which transforms $2^n$ coefficients, n stages are needed to complete the backward transform, and at the $i^{th}$ stage, the transform takes $2^{(n-i-1)}$ twiddle factors, where i=0, 1, 2 . . . (n−1).

Figure 5:
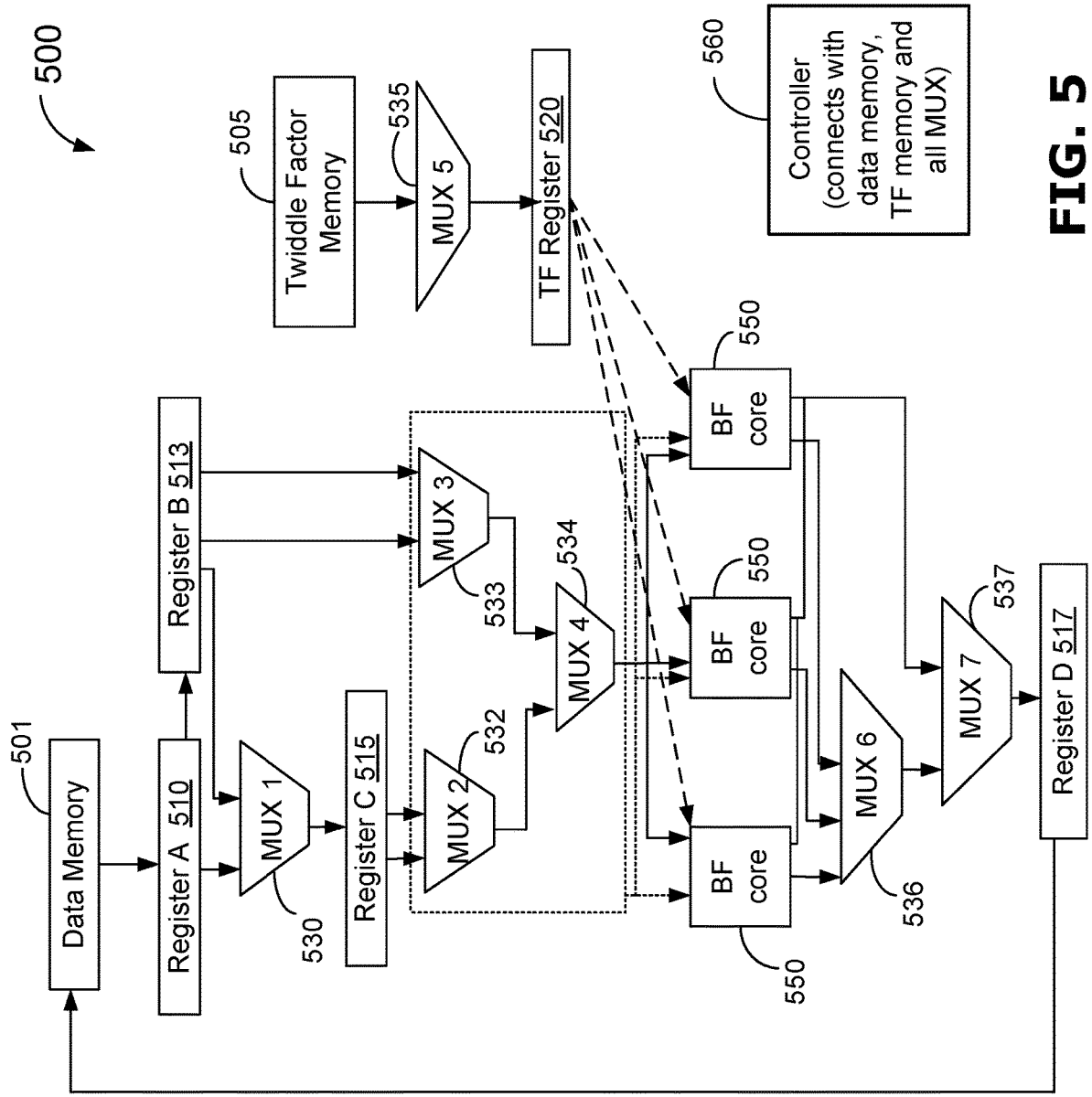
FIG. 5 illustrates a schematic diagram for an example hardware architecture for a FHE processing unit.

FIG. 5 illustrates a schematic diagram for an example hardware architecture 500 included in an example FHE processing unit 150. This architecture 500 utilizes a data memory 501 which stores the coefficients in a given polynomial P that needs to be transformed and the intermediate data during a BFT operation 200. The required twiddle factors (TFs) can be predetermined and stored in the twiddle factor (TF) memory 505 in a sequential manner as shown below in Table 2. Each unit of the data memory 501 and TF memory 505 is a block RAM (BRAM). The data memory 501 has two independent ports where at each cycle, each port can, without interference from the other port, do a read or write operation. For example, the first port may perform a read operation, while the second port may perform a write operation, in the same clock cycle. The two ports may also perform the same operation, i.e., both ports read or both ports write, during the same clock cycle. The TF memory 505 has a single port which supports either a write or read operation at one clock cycle.

At every clock cycle, Register A 510 and Register B 513 each reads a coefficient from the data memory 501 and forwards the respective coefficient to MUX 1 530, which selects an appropriate coefficient for sending to Register C 515. Register B 513 forwards the coefficients to MUX 3 533. For each input coefficient of BF core 550, a set of multiplexers (MUX 2 532, MUX 3 533, MUX 4 534) select the correct coefficients for each respective BF core 550 among a plurality of BF cores 550. During each clock cycle, a MUX 5 535 selects an appropriate TF from TF memory 505, and sends it to TF Register 520, which sends the TF to the appropriate BF core 550. The output of the BF cores 550, i.e., the transformed coefficients, are then sent to MUX 6 536 and MUX 7 537, which select the appropriate coefficients for sending to Register D 517.

It is worth noting that each MUX 530, 532, 533, 534, 535, 536, 537 may include a set of MUXs (see FIG. 6 and Table 3 below) connected in parallel based on the total number of inputs and outputs required. In some embodiments, while not shown in the FIG. 5, there may exist more registers inside each MUX.

A controller 560 connects with data memory 501, TF memory 505 and all MUXs 530, 532, 533, 534, 535, 536, 537 for selecting coefficients and TFs, and to ensure the NTT operation is carried correctly.

Tables 1 and 2 below each demonstrates the layout for data memory 501 and TF memory 505 for both BFT operation 200 and IBFT operation 220. NC denotes the total number of BF cores 210 or IBF cores 230 utilized in the architecture 500. N represents the total number of coefficients of a given polynomial.

TABLE 1

Data Memory Organization

| BRAM 0 | BRAM 1 | BRAM 2 | . . . | BRAM 2NC − 1 |
|---|---|---|---|---|
| 0 | 1 | 2 | . . . | 2NC − 1 |
| 2NC | . . . | . . . | . . . | . . . |
| . . . | . . . | . . . | . . . | . . . |
| N − 2NC | N − 2NC + 1 | N − 2NC + 2 | | N − 1 |
| Data Memory Depth | N/2NC | Total number of BRAM blocks | 2NC | |

TABLE 2

TF Memory Organization

| BRAM 0 | BRAM 1 | BRAM 2 | . . . | BRAM NC − 1 |
|---|---|---|---|---|
| 0 | 1 | 2 | . . . | NC − 1 |
| NC | . . . | . . . | . . . | 2NC − 1 |
| . . . | . . . | . . . | . . . | . . . |
| N − NC | N − NC + 1 | N − NC + 2 | | N − 1 |
| Twiddle Memory Depth | N/NC | Total number of BRAM blocks | NC | |

Figure 6:
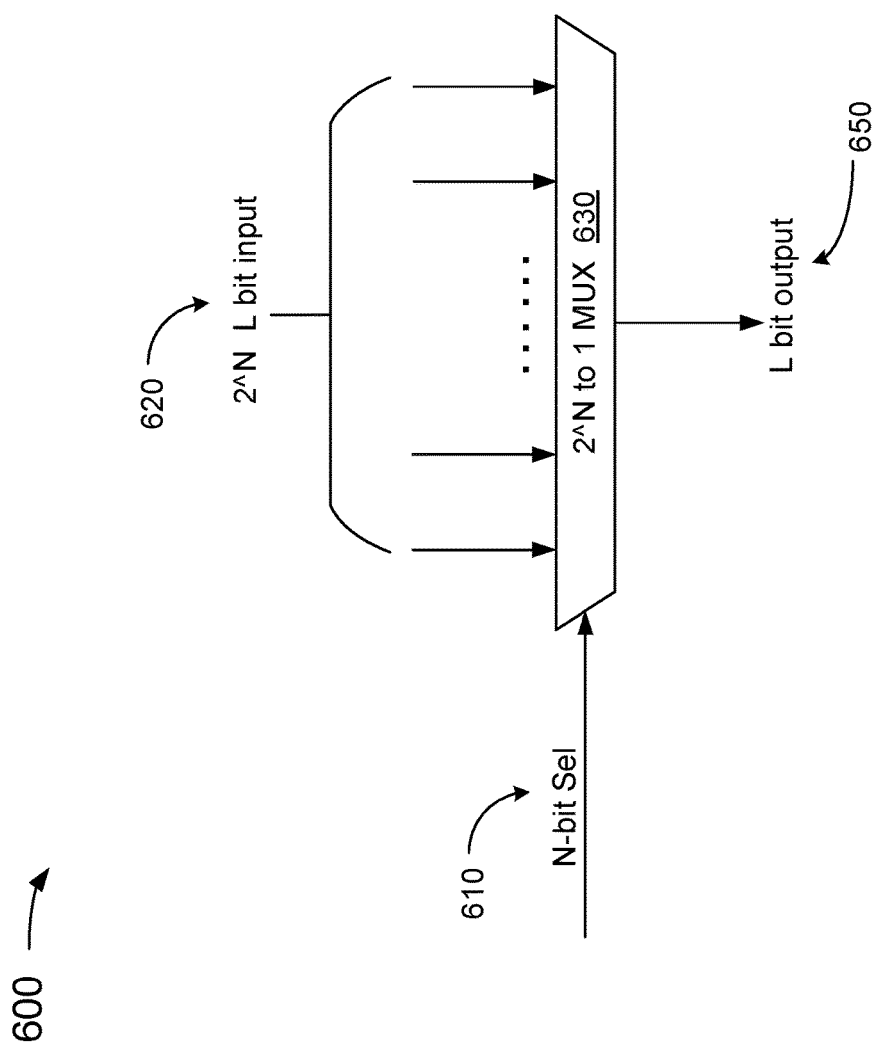
FIG. 6 illustrates a schematic diagram for an example multiplexor (MUX) used in an example FHE processing unit.

FIG. 6 illustrates a schematic diagram 600 for an example multiplexor (MUX) 630, which may be a MUX used in any of the MUXs 530, 532, 533, 534, 535, 536, 537 in the hardware architecture 500. The MUX 630 can be used to select the correct output from multiple inputs. The example MUX 630 is a $2^N$ to 1 L-bit multiplexor. That is, the MUX 630 has $2^N$ input wires 620, with each input wire capable of receiving L bits, and can output an L-bit output 650. A set of N-bit selection inputs, N-bit SEL lines 610, can determine which of the $2^N$ input wires 620 should be passed to the output 650.

Generally, to improve the performance of the BFT operation, an efficient approach is to increase the number of BF cores 210, NC, to enable more parallel computing. However, with the increased number of BF cores 210, the number of inputs to the associated MUX is also increased and in turn, the total number of MUX is increased.

Table 3 below shows the total number of the MUXs and number of inputs for each MUX, from MUX 1 530 to MUX 7 537. NC denotes the total number of BF cores 210 in the architecture 500.

TABLE 3

Size and Number of MUXs Relative to Number of BF Cores (NC)

| MUX Index | 1 | 2 | 3 | 4 | 5 | 6 | 7 |
|---|---|---|---|---|---|---|---|
| # of Input | 2 | Max = ($\log_2(2 * NC)$) | 2 | 2 | NC | Max = ($\log_2(2 * NC)$) | 2 |
| # of MUX | 2 * NC | 4 * NC | NC | NC | NC | 4 * NC | NC |

In general, both the number of inputs and the total number of the MUXs for each of MUX 1, 2, 3, 4, 5, 6 and 7 in FIG. 5 increase as the total number of BF cores NC increases. Especially for MUX 5 535, the number of inputs for MUX 5 535 and the number of MUXs for MUX 5 535 both increase linearly with the number of BF cores 210. Therefore, the hardware architecture 500 in FIG. 5 has the drawback that larger parallel computing may significantly increase the total combinational logic resource consumed. In addition, a large number of inputs for a MUX tends to result in a significant data propagation delay, which limits the clock speed. This issue could be resolved by adding more pipeline stages. However, adding more pipeline stages also significantly increases the required footage area for circuit, as each register is expensive.

Furthermore, with seven MUXs in the hardware architecture 500, the pipeline flow design is complex since the controller needs to carefully arrange the data through different MUXs and in different pipeline stages. Hence, a simpler structure is desired to simplify pipeline flow design and increase the total throughput without excessive pipeline structure for the MUXs.

Figure 7:
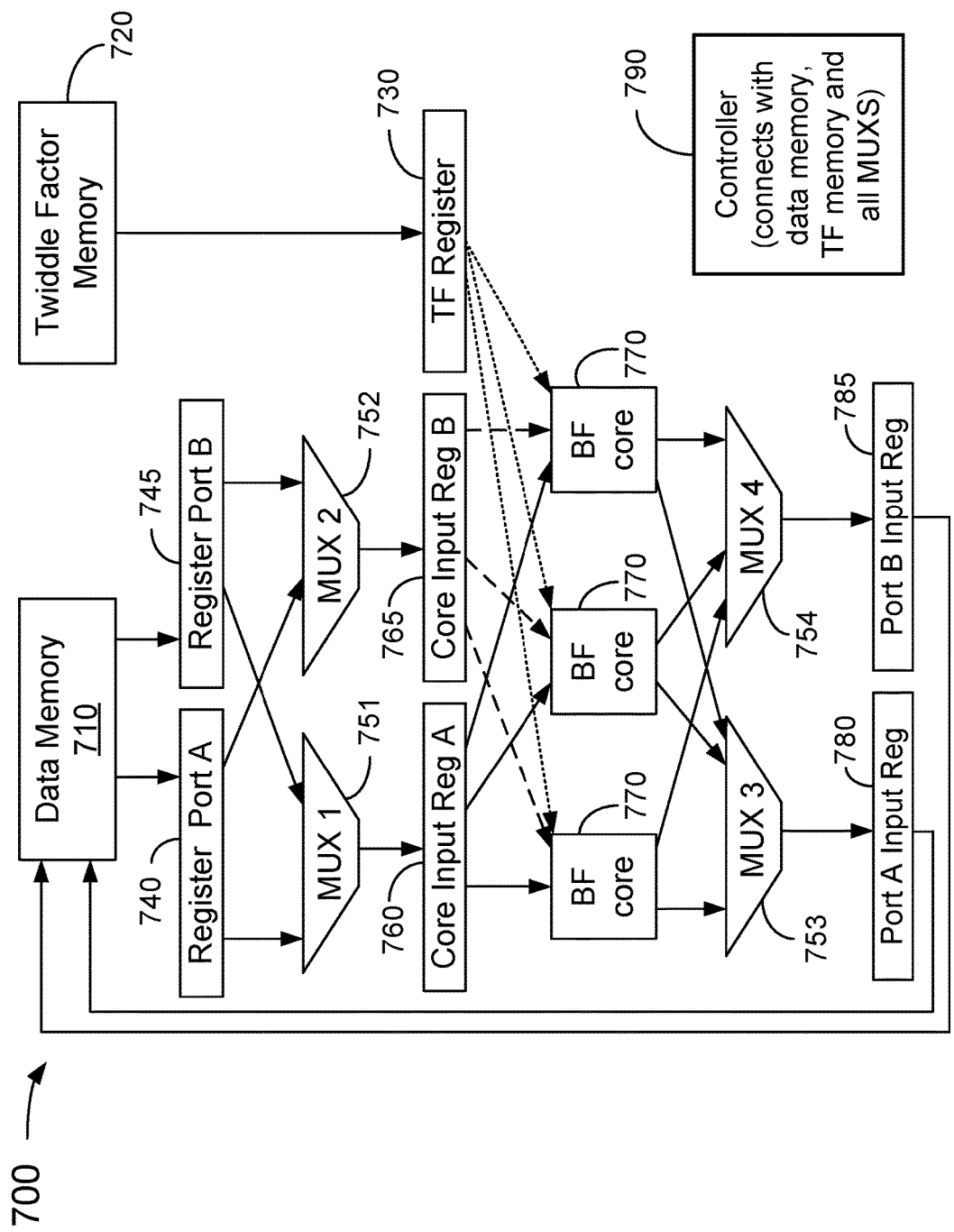
FIG. 7 illustrates a schematic diagram for an example hardware architecture for an improved FHE processing unit, in accordance with some example embodiments.

FIG. 7 illustrates a schematic diagram for an example hardware architecture 700 for a FHE processing unit 150, in accordance with some example embodiments.

As mentioned above, for the hardware architecture 500 in FIG. 5, higher parallel computing is limited, since an increase of number of BF cores also leads to the necessary increase of the size and total number of the MUXs required. The hardware architecture 700 shown in FIG. 7 provides an improved configuration that eliminates the largest MUX, i.e., MUX 5, to enable a higher amount of parallel computing and simplified data path and pipeline design.

The hardware architecture 700 may include a data memory 710, which may be a dual-port random access memory (RAM), for storing the polynomial. The dual-port RAM, or DPRAM, may have a Port A and a Port B, where each of the Port A and Port B may be configured for read or write operation during different clock cycles. For example, Port A and Port B may be configured for reading in the same clock cycle, or Port A may be configured for reading while port B may be configured for writing in the same clock cycle. The configuration may be dictated by a control signal from controller 790.

Using a dual-port RAM as data memory 710 enables a straight forward pipeline flow, as Register Port A 740 and Register Port B 745 can each read a respective coefficient in the same clock cycle from the data memory 710, which means there is no conflict between a memory read operation and a memory write operation.

In some example embodiments, the TF memory 720 is configured to store the required TF value(s) for each transform stage in a pre-arranged configuration, such that the TF data from the TF memory 720 can be directly sent to the BF cores 770 without using a MUX to select the correct input for each respective BF core 770. A controller 790, which may include a control circuitry, may be connected to the data memory 710, the TF memory 720 and all the MUXs 751, 752, 753, 754 for controlling of the BFT operation 200 performed by the hardware architecture 700. For ease of illustration, the data path for control signals are not shown in FIG. 7.

Table 4 below shows an example pipeline flow for one transform stage, based on the configuration shown in hardware architecture 700, with the memory read and memory write operations never during the same clock cycle. This configuration ensures that there is no conflict between memory read and memory write operations.

TABLE 4

| | Pipeline Flow for Two Transform Stages | | | | | | | | | | | | |
|---|---|---|---|---|---|---|---|---|---|---|---|---|---|
| Cycle Count | 0 | 1 | 2 | 3 | 4 | 5 | 6 | 7 | 8 | 9 | 10 | 11 | 12 |
| Memory Read | R | | R | | R | | R | | R | | R | | R |
| Load to Register A and B | | L1 | L1 | L1 | L1 | L1 | L1 | L1 | L1 | L1 | L1 | L1 | L1 |
| Load to Core Input Reg A and B | | | L2 | L2 | L2 | L2 | L2 | L2 | L2 | L2 | L2 | L2 | L2 |
| TRANSFORM STAGE 1 | | | | T | T | T | T | T | T | T | T | T | T |
| TRANSFORM STAGE 2 | | | | | T | T | T | T | T | T | T | T | T |
| Load to Port A and B Input Reg | | | | | | L3 | L3 | L3 | L3 | L3 | L3 | L3 | L3 |
| Memory Write | | | | | | | | | W | | W | | W |

The letters "L1", "L2", "L3", "R", "T" and "W" each represents, respectively: loading to Register Port A 740 and Port B 745 operation, loading to Core Input Register A 760 and Core Input Register B 765 operation, loading to Port A Input Register 780 and Port B Input Register 785 operation, a memory read operation, a coefficient transformation operation and a memory write operation, respectively. Each memory read operation from data memory 710 includes retrieval of two rows of data (e.g., 2*2*NC=4*NC coefficients) from the dual-port data memory 710, and the retrieved data are stored, respectively, in a set of first registers: Register Port A 740 and Register Port B 745. Each memory read operation from the data memory 710 can retrieve as many as 4*NC of coefficients from the memory, where NC represents the total number of BF cores 770.

In a set of eight consecutive clock cycles (e.g., clock cycles 0 to 7 in Table 4), a memory read operation, two L1 operations, two L2 operations, two L3 operations, four transform operations and one memory write operation form one set of operations for a group of coefficients (4*NC), as indicated, in one case, by bolded "L1", "L2", "L3", "R", "T" and "W" from cycle 0 to 7. For example, in clock cycle (hereinafter "cycle") 0, the controller 790 sends a control signal to the data memory 710 for reading coefficient data, e.g., coefficient values, from memory address 0 and 1. The coefficient data are then stored in Register Port A 740 and Register Port B 745, and in cycle 1, the first half of the coefficient data are passed onto a set of first multiplexors: MUX 1 751 and MUX 2 752. While at cycle 2, the second half of the coefficient data are passed onto a set of first multiplexors: MUX 1 751 and MUX 2 752.

Next, at cycle 2 and 3, MUX 1 751 selects and sends the appropriate NC coefficients to Core Input Register A 760, while MUX 2 752 selects and sends the appropriate NC coefficients to Core Input Register B 765. Core Input Register A 760 and Core Input Register B 765 may be referred as second registers. The Core Input Register A 760 and Core Input Register B 765 can, at cycle 3 and 4, write the respective coefficient to each of the BF cores 770, which also receives the TF value from the TF register 730.

The coefficients and TF value are processed at transform stage 1 in cycle 3 and 4 by the BF cores 770 to generate the intermediate transformed coefficients. At cycle 4 and 5, the final transformed coefficients are selected by a set of second MUXs: MUXs 753, 754, and then at cycle 5 and 6, load into the Port A Input Register 780 and Port B Input Register 785. Finally at cycle 7, the coefficients are written back to the data memory 710.

In some embodiments, the BF cores 210 or IBF cores 230 may have multiple pipeline stages, which means there may be multiple cycles required to finish the transform. As long as the BF cores 210 or IBF cores 230 have even number of pipeline stages, there is no conflict between memory write and read operations.

The processing of the second group of coefficients, indicated in Table 4 by underlined "R", "T" and "W" starts at cycle 2 and ends at cycle 9. There is no conflict between memory write operation and memory read operation for data memory 710. In addition, each BF core 770 is utilized in each clock cycle to perform the transform operation to transform the read coefficients, which ensures a 100% utilization of the BF cores 770, leading to a higher efficiency of the hardware architecture 700 for performing BFT operations 200.

In some embodiments, depending on the number of transform stages performed a given BF core 770, the corresponding pipeline flow of the read, transform, and write operations may be different. Generally, when the BF core 770 has an even number of pipeline stages, there is no conflict between memory read operation and memory write operation, and the BF core 770 is utilized 100% in subsequent clock cycles after the initial cycle when the very first set of coefficient values are retrieved from the data memory 710 (i.e., cycle 0 in Table 5 below). The general pipeline flow for when a BF core 770 has i transform stages are shown in Table 5 below.

TABLE 5

| | Pipeline Flow for Multiple Transform Stages | | | | | | | | | | | | |
|---|---|---|---|---|---|---|---|---|---|---|---|---|---|
| Cycle Count | 0 | 1 | 2 | 3 | 4 | i + 1 | i + 2 | i + 3 | i + 4 | i + 5 | i + 6 | i + 7 | i + 8 |
| Memory Read | R | | R | | R | R | | R | | R | | R | R |
| Load to Register A and B | | L1 | L1 | L1 | L1 | L1 | L1 | L1 | L1 | L1 | L1 | L1 | L1 |
| Load to Core input Reg A and B | | | L2 | L2 | L2 | L2 | L2 | L2 | L2 | L2 | L2 | L2 | L2 |
| TRANSFORM STAGE 1 | | | | T | T | T | T | T | T | T | T | T | T |
| TRANSFORM STAGE 2 | | | | | T | T | T | T | T | T | T | T | T |
| TRANSFORM STAGE i − 1 | | | | | | T | T | T | T | T | T | T | T |
| TRANSFORM STAGE i | | | | | | | T | T | T | T | T | T | T |
| Load to Port A and B Input Reg | | | | | | | | L3 | L3 | L3 | L3 | L3 | L3 |
| Memory Write | | | | | | | | | | W | | W | |

The advantages of the hardware architecture 700 shown in FIG. 7 includes a fully pipelined design where one or more BF cores 770 are utilized 100% or close to 100%. Moreover, the multiplier operation inside each BF core 770 can be easily configured with different pipeline stages. As long as the BF core 770 has an even number of pipeline stages, there can be no conflict between a memory write operation and a memory read operation, which ensures the 100% BF core utilization.

TF Memory Design

In some embodiments, a TF memory organization layout is implemented to ensure that the TF values read out from the TF memory is perfectly aligned with the required TF values for each BF or IBF core. For example, the TF memory 720 from FIG. 7 can be designed to eliminate the need for a MUX between the TF memory 720 and each BF core 770. Table 6 shows an example TF memory organization layout ("memory layout") for BFT Operations, where the TF memory depth is determined by the equation $[\log_2(NC) * 2^{(\log_2(N)-1)}/NC + N/NC - 1]$, N representing the number of coefficients of a given polynomial, and NC representing the total number of BF cores 770 in the hardware architecture 700.

TABLE 6

Example TF Memory Layout for BFT Operation

| Index Range | | Number of | TF Memory Organization | | | | |
|---|---|---|---|---|---|---|---|
| From | To | Repetitions | BRAM 0 | BRAM 1 | BRAM 2 | ... | BRAM NC − 1 |
| 1 | N/NC − 1 | NC | (TF Value Index) 1 | 1 | 1 | ... | 1 |
| | | | 2 | 2 | 2 | ... | 2 |
| | | | ... | ... | ... | ... | ... |
| | | | N/NC − 1 | N/NC − 1 | N/NC − 1 | ... | N/NC − 1 |
| N/NC | 2*N/NC − 1 | NC/2 | N/NC | N/NC | ... | N/NC + 1 | N/NC + 1 |
| | | | ... | ... | ... | ... | ... |
| | | | 2*N/NC − 2 | 2*N/NC − 2 | ... | 2*N/NC − 1 | 2*N/NC − 1 |
| 2*N/NC | 4*N/NC − 1 | NC/4 | ... | ... | ... | ... | ... |
| 4*N/NC | 8*N/NC − 1 | NC/8 | ... | ... | ... | ... | ... |
| $2^i$ * N/NC | $2^{i+1}$ * N/NC − 1 | NC/$2^{i+1}$ | ... | ... | ... | ... | ... |
| ... | ... | ... | | | | | |
| N/2 | N − 1 | 1 | N − NC | N − NC + 1 | ... | N − 2 | N − 1 |

In some embodiments, instead of storing the TF values sequentially in the TF memory 720, the TF values are stored in a repeated manner based on a respective index. As shown in Table 6, each TF value has an index number (e.g., "TF index"), and the memory is designed such that: for TF index from 1 to N/NC−1, each TF value is stored in the TF memory 720 a total of NC times; for TF index from N/NC to 2*N/NC−1, each TF value is stored in the TF memory 720 a total of NC/2 times; for TF index from 2*N/NC to 4*N/NC−1, each TF value is stored in the TF memory 720 a total of NC/4 times, and so on. Generally, for TF index from $2^i$*N/NC to $2^{i+1}$*N/NC−1, the TF values are stored NC/$2^{i+1}$ times, and when $2^i$/NC reaches ½, the BFT operation enters the last stage where the index of the TF is from N/2 to N−1, then each TF value is only stored once.

In some embodiments, a TF index number can be predetermined during an algorithm initialization phase. In addition, Number Theoretic Transform (NTT) uses the powers of the $N^{th}$ root of unity modulo a prime number as twiddle factors to perform modular arithmetic operations in an integer space. Therefore, the TF value can be calculated as base to the power of index modular a modulus P (prime number), i.e., $base^{index}$ mod P. For example, if the base is 2 and the power is 3, and the prime number is 5, the respective TF value can be determined based on the equation TF Value=$2^3$ mod 5, which is 3.

The TF memory 720 may store the TF values on NC number of BRAMs, indexed from 0 to NC−1, as shown in Table 6. For example, for each of the TF values with index value between 1 to N/NC−1, it is stored exactly once on each of the BRAMs, from BRAM 0 to BRAM NC−1. Hence, each TF value is stored NC times in the TF memory 720. For another example, for each of the TF values with index value between N/NC to 2*N/NC−1, it is stored exactly once on each BRAM of ½ of the BRAMs, meaning the TF values with index value between N/NC to 2*N/NC−1 are stored NC/2 times on the TF memory 720, and so on.

This memory layout for TF memory 720 as shown in Table 6 ensures that each time the TF register 730 reads from the TF Memory 720, the TF register 730 retrieves exactly what are required by each BF core 770 for performing the BFT operation 200 in each transform stage.

Similarly, a novel TF memory layout for IBFT operations is shown in Table 7 below, where the TF memory depth is determined by the equation [$\log_2(NC)*2^{(\log_2(N)-1)}$/NC+N/NC−1], N representing the number of coefficients of a given polynomial, and NC representing the total number of IBF cores in the hardware architecture.

TABLE 7

Example TF Memory Layout for IBFT Operation

| Index Range | | Repeat | TF Memory Organization | | | | |
|---|---|---|---|---|---|---|---|
| From | To | Time | BRAM 0 | BRAM 1 | BRAM 2 | ... | BRAM NC − 1 |
| N/2 | N − 1 | 1 | (TF Value Index) N/2 | N/2 + 1 | N/2 + 2 | ... | N/2 + NC − 1 |
| | | | N/2 + NC | N/2 + NC + 1 | N/2 + NC + 2 | ... | N/2 + 2NC − 1 |
| | | | ... | ... | ... | ... | ... |
| | | | N − NC | N − NC + 1 | N − NC + 2 | ... | N − 1 |
| N/4 | N/2 − 1 | 2 | N/4 | N/4 | N/4 + 1 | ... | N/4 + NC/2 − 1 |
| | | | ... | ... | ... | ... | ... |
| | | | 2*N/NC − 2 | 2*N/NC − 2 | ... | 2*N/NC − 1 | N/2 − 1 |
| N/8 | N/4 − 1 | 4 | ... | ... | ... | ... | ... |
| $N/2^i$ | $N/2^{i-1}$ − 1 | $2^{i-1}$ | ... | ... | ... | ... | ... |
| $N/2^{(\log_2(NC)+1)}$ | $N/2^{(\log_2(NC))}$ − 1 | NC | ... | ... | ... | ... | ... |
| ... | ... | ... | | | | | |
| 1 | 1 | NC | 1 | 1 | ... | 1 | 1 | shown in Table 7, each TF value has an index number (e.g., "TF index"), and the memory is designed such that: for TF index from N/2 to N−1, each TF value is stored in the TF memory only once; for TF index from N/4 to N/2−1, each TF value is stored in the TF memory twice; for TF index from N/8 to N/4−1, each TF value is stored in the TF memory 4 times, and so on. Generally, for TF index from $N/2^i$ to $N/2^{(i-1)}$, each TF value will be stored $2^{(i-1)}$ times when $2^{(i-1)} < NC$. If $2^{(i-1)} >= NC$, each TF value is stored NC times in the TF memory.

The respective memory layout for TF memory as shown in each of Table 6 and Table 7 ensures that each time the TF register reads from the TF Memory, the TF register retrieves exactly what are required by each BF or IBF core for performing the BFT or IBFT operation in each transform stage. Therefore, there is no need for any MUX between the TF memory and the BF or IBF core.

Compared to the hardware architecture 500 shown in FIG. 5, the largest MUX (e.g., the MUX 5), is no longer present in the hardware architecture 700 shown in FIG. 7, where the TF memory 720 is designed based on the memory layout in Table 6. By eliminating the largest MUX from the design, massive parallel computing can be achieved, leading to a much greater throughput. For example, for a polynomial of degree $2^{13}-1$, it requires $13*N/(2*NC)$ cycles to finish the transform. With larger NC, the total number of clock cycles required to finish one polynomial transform can be reduced. That is, the total throughput of the FHE processing unit 150 employing the hardware architecture 700 increases linearly with the number of BF or IBF cores, where NC represents the total number of BF or IBF cores in the hardware architecture.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., an onboard processor, a personal computer, a server, or a network device) to execute examples of the methods disclosed herein.

Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A processing unit for fully homomorphic encryption (FHE), comprising:
    a data memory for storing coefficients for a polynomial;
    a twiddle factor (TF) memory for storing TF values associated with the polynomial;
    a TF register connected to the TF memory;
    a plurality of first registers connected to the data memory;
    a plurality of first multiplexors (MUXs) connected to the first registers;
    a plurality of second registers connected to the plurality of first MUXs;
    a plurality of Butterfly (BF) cores connected to the plurality of the second registers and the TF register;
    a plurality of second MUXs connected to the plurality of BF cores; and
    a plurality of third registers connected to the plurality of second MUXs and to the data memory;
    wherein each of the plurality of BF cores is configured to, responsive to a control signal, perform a Butterfly Transform (BFT) operation based on two coefficients from the data memory and a TF value from the TF memory,
    wherein at least one of the plurality of second MUXs is configured to, responsive to a control signal, select one of two transformed coefficients from the plurality of BF cores,
    wherein at least one of the plurality of third registers is configured to retrieve the selected transformed coefficient from the at least one of the plurality of second MUXs for writing to the data memory,
    wherein the data memory comprises a dual-port random access memory (DPRAM) having: a first port ("Port A") and a second port ("Port B"),
    wherein the plurality of first registers comprises: a Port A first register connected to the Port A of the data memory; and a Port B first register connected to the Port B of the data memory,
    wherein the Port A first register and the Port B first register are configured to read the two coefficients from the data memory in a first clock cycle, and
    wherein the Port A first register and Port B first register are configured to write the coefficients to the plurality of first MUXs in the first clock cycle.

2. The processing unit of claim 1, wherein the plurality of third registers comprises: a Port A third register connected to the Port A of the data memory; and a Port B third register connected to the Port B of the data memory, wherein the Port A third register and Port B third register are configured to write the two transformed coefficients to the data memory in a subsequent clock cycle after the first clock cycle.

3. The processing unit of claim 2, wherein each of the plurality of BF cores is configured to, responsive to a control signal, perform the BFT operation in each of a plurality of clock cycles immediately subsequent to the first clock cycle.

4. The processing unit of claim 1, wherein the TF memory is configured to store a plurality of TF values required to perform a plurality of BFT operations by the plurality of BF cores.

5. The processing unit of claim 4, wherein some of the TF values are stored multiple times on the TF memory.

* * * * *